(12) United States Patent
Hu et al.

(10) Patent No.: US 9,424,317 B2
(45) Date of Patent: *Aug. 23, 2016

(54) RANKING ALGORITHM FOR SEARCH QUERIES

(71) Applicant: eBay Inc., San Jose, CA (US)

(72) Inventors: Wenyan Hu, Shanghai (CN); Xiaodi Zhang, New York, NY (US); Alvaro Bolivar, San Francisco, CA (US); Randall Scott Shoup, San Francisco, CA (US)

(73) Assignee: eBay Inc., San Jose, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/229,954

(22) Filed: Mar. 30, 2014

(65) Prior Publication Data

US 2014/0214817 A1 Jul. 31, 2014

Related U.S. Application Data

(63) Continuation of application No. 12/416,049, filed on Mar. 31, 2009, now Pat. No. 8,738,641.

(51) Int. Cl.
*G06F 17/30* (2006.01)

(52) U.S. Cl.
CPC ..... *G06F 17/3053* (2013.01); *G06F 17/30672* (2013.01); *G06F 17/30675* (2013.01)

(58) Field of Classification Search
CPC ................ G06F 17/30867; G06F 17/30672; G06F 17/3053
See application file for complete search history.

(56) References Cited

U.S. PATENT DOCUMENTS

| | | | |
|---|---|---|---|
| 6,564,213 B1 * | 5/2003 | Ortega et al. | |
| 7,716,219 B2 | 5/2010 | Sarukkai et al. | |
| 8,126,881 B1 * | 2/2012 | Sethi et al. | 707/723 |
| 8,738,641 B2 | 5/2014 | Hu et al. | |
| 2007/0043714 A1 * | 2/2007 | Stanton et al. | 707/4 |
| 2007/0143266 A1 * | 6/2007 | Tang | G06F 17/30864 |
| 2007/0255702 A1 * | 11/2007 | Orme | G06F 17/30696 |
| 2008/0022211 A1 * | 1/2008 | Jones et al. | 715/739 |
| 2008/0312901 A1 | 12/2008 | Torii et al. | |
| 2009/0063304 A1 | 3/2009 | Meggs | |
| 2009/0083028 A1 | 3/2009 | Davtchev et al. | |
| 2010/0169341 A1 | 7/2010 | Hu et al. | |
| 2010/0250524 A1 | 9/2010 | Hu et al. | |

OTHER PUBLICATIONS

"U.S. Appl. No. 12/416,049, Decision on Pre-Appeal Brief Request mailed Nov. 21, 2011", 2 pgs.
"U.S. Appl. No. 12/416,049, Final Office Action mailed May 15, 2012", 26 pgs.
"U.S. Appl. No. 12/416,049, Final Office Action mailed Oct. 20, 2011", 22 pgs.

(Continued)

*Primary Examiner* — Tarek Chbouki
(74) *Attorney, Agent, or Firm* — Schwegman, Lundberg & Woessner, P.A.

(57) ABSTRACT

In various embodiments, a method of prioritizing search results in an electronic environment is disclosed. The method includes selecting a plurality of equivalent keywords responsive to a search query from an end-user, determining a rank of each of the plurality of equivalent keywords, selecting a plurality of most highly ranked keywords from the plurality of equivalent keywords, and preparing a response including the plurality of most highly ranked keywords.

19 Claims, 5 Drawing Sheets

(56) References Cited

OTHER PUBLICATIONS

"U.S. Appl. No. 12/416,049, Non Final Office Action mailed Jan. 6, 2012", 19pgs.

"U.S. Appl. No. 12/416,049, Non Final Office Action mailed Jan. 31, 2013", 28 pgs.

"U.S. Appl. No. 12/416,049, Non Final Office Action mailed Feb. 17, 2011", 18 pgs.

"U.S. Appl. No. 12/416,049, Non Final Office Action mailed Jul. 6, 2011", 22 pgs.

"U.S. Appl. No. 12/416,049, Non Final Office Action mailed Aug. 7, 2013", 28 pgs.

"U.S. Appl. No. 12/416,049, Notice of Allowance mailed Jan. 14, 2014", 8 pgs.

"U.S. Appl. No. 12/416,049, Pre-Appeal Brief Request filed Oct. 31, 2011", 5 pgs.

"U.S. Appl. No. 12/416,049, Response filed Mar. 30, 2012 to Non Final Office Action mailed Jan. 6, 2012", 15 pgs.

"U.S. Appl. No. 12/416,049, Response filed Apr. 26, 2011 to Non-Final Office Action mailed Feb. 17, 2011", 14 pgs.

"U.S. Appl. No. 12/416,049, Response filed May 28, 2013 to Non Final Office Action mailed Jan. 31, 2013", 17 pgs.

"U.S. Appl. No. 12/416,049, Response filed Sep. 14, 2011 to Non-Final Office Action Recieved Jul. 6, 2011", 14 pgs.

"U.S. Appl. No. 12/416,049, Response filed Sep. 17, 2012 to Final Office Action mailed May 15, 2012", 17 pgs.

"U.S. Appl. No. 12/416,049, Response filed Oct. 4, 2013 to Non Final Office Action mailed Aug. 7, 2012", 15 pgs.

\* cited by examiner

RANKING ALGORITHM FOR SEARCH QUERIES

TECHNICAL FIELD

The present application relates generally to the field of computer technology and, in a specific exemplary embodiment, to a system and method of optimizing a response to a keyword search or query of an end-user based on a ranking of the keyword.

BACKGROUND

During the past several years, a substantial growth has occurred in the quantity and diversity of information and services available over the Internet. The number of users of the Internet has similarly grown rapidly. A predominant growth area on the Internet has been in the use of the World Wide Web, often referred to as WWW, W3, or simply "the Web." The hyper-text transfer protocol (HTTP) that serves as a foundation protocol for the Web has been widely adopted and implemented in numerous Web browsers and Web servers.

Web browsers provide a convenient user application for receiving textual and graphical information of individual Web pages in a scrollable display page format. The Web pages frequently allow a typical end-user to access a variety of educational, commercial, and retail Web sites through search boxes.

A search box auto-complete function has become an increasingly popular feature on many Web sites in recent years. The feature is now available on numerous sites, including Shopping.com, Yahoo!®, and Google Toolbar. However, traditional search box auto-complete has no ranking functionality, which means the auto-complete backend system will only respond with a generalized keyword list against a prefix from which the request is made. Thus, the end-user may not get expected results from the returned keyword list.

BRIEF DESCRIPTION OF DRAWINGS

Various ones of the appended drawings merely illustrate exemplary embodiments of the present invention and cannot be considered as limiting its scope.

DETAILED DESCRIPTION

Figure 1:
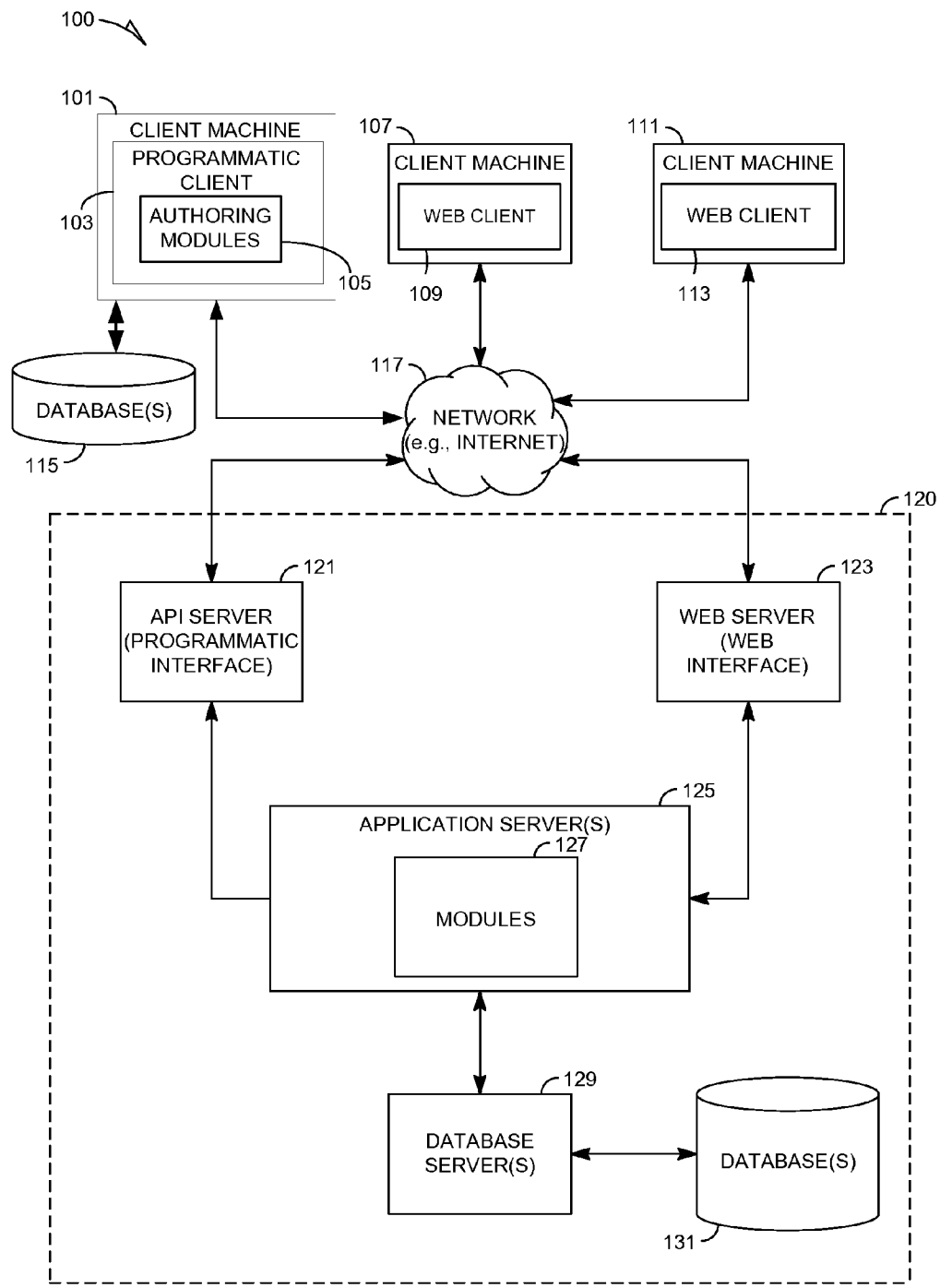
FIG. 1 is a block diagram of an exemplary embodiment of a high-level client-server-based network architecture diagram depicting a system used to process end-user queries.

The description that follows includes illustrative systems, methods, techniques, instruction sequences, and computing machine program products that embody the present invention. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on end-user queries in an electronic retail environment, the embodiments are given merely for clarity in disclosure. Thus, any type of electronic commerce or electronic business system and method, including various system architectures, may employ various embodiments of the end-user query auto-complete system and method described herein and is considered as being within a scope of the present invention.

In an exemplary embodiment, a system for prioritizing search results in an electronic environment is disclosed. The system includes a communications module for receiving a search query from an end-user. The search query is generated by the end-user in a search box contained in, for example, a web page and includes one or more characters. The search query is then transmitted to the communications module within a single transmission control protocol (TCP) packet. A query engine, in electronic communication with communications module, uses the characters from the search query to match against a plurality of selected keywords contained within a data structure (e.g., a database). Each selected and matched keyword is then ranked by, for example, the number of items found or sold for the particular keyword used as a search term, within the plurality of selected keywords. A subset of the selected keywords is then formed based on the ranking A generated response that includes the subset of selected keywords is returned to the end-user.

In another exemplary embodiment, a method to prioritize or rank search results in an electronic environment in response to a search query received from an end-user is disclosed. The method includes selecting a plurality of equivalent keywords for the search query. Equivalent keywords include, for example, similar keywords that match portions of the characters. Each of the plurality of equivalent keywords is then evaluated based on a ranking of the keyword. A plurality of the most highly ranked keywords is selected from the plurality of equivalent keywords and a response including the plurality of most highly ranked keywords is prepared and returned to the end-user.

In another exemplary embodiment, a machine-readable storage medium (e.g., a DVD or CD-ROM) storing an instruction is disclosed such that, when executed by a processor, causes the processor to perform a method to rank or prioritize search results in an electronic environment in response to a search query received from an end-user. The method includes selecting a plurality of equivalent keywords for the search query. Equivalent keywords include, for example, similar keywords that match portions of the characters. Each of the plurality of equivalent keywords is then evaluated based on a ranking of the keyword. A plurality of the most highly ranked keywords is selected from the plurality of equivalent keywords and a response including the plurality of most highly ranked keywords is prepared and returned to the end-user.

In another exemplary embodiment, a system for prioritizing search results in an electronic environment is disclosed. The system includes a communications module for receiving a search query. The search query includes one or more characters contained within a single TCP packet. A searching means for using the characters from the query is used to match against a plurality of selected keywords contained within a data structure. Each keyword within the plurality of selected keywords is ranked and a subset of the plurality of selected keywords is formed based on the rank. A response from the characters is formed and returned to the end-user.

Each of these exemplary embodiments, and others, is discussed in detail, below.

With reference to FIG. 1, a high-level network diagram of an embodiment of an exemplary system 100 with a client-server architecture includes a first client machine 101, a second client machine 107, a third client machine 111, a network 117 (e.g., the Internet), and an information storage and retrieval platform 120. The information storage and retrieval platform 120 may constitute a commerce platform or commerce server and provides server-side functionality, via the network 117, to the first 101, second 107, and third 111 client machines. A programmatic client 103 in the form of authoring modules 105 is executing on the first client machine 101, a first web client 109 (e.g., a browser, such as the Internet Explorer browser developed by Microsoft Corporation of Redmond, Wash.) is executing on the second client machine 107, and a second web client 113 is executing on the third client machine 111. Additionally, the first client machine 101 is coupled to one or more databases 115.

Turning to the information storage and retrieval platform 120, an application program interface (API) server 121 and a web server 123 are coupled to, and provide programmatic and web interfaces respectively to, one or more application servers 125. The application servers 125 host one or more modules 127 (e.g., modules, applications, engines, etc.). The application servers 125 are, in turn, coupled to one or more database servers 129 that facilitate access to one or more information storage databases 131. The one or more modules 127 provide a number of information storage and retrieval functions and services to users that access the information storage and retrieval platform 120. The one or more modules 127 are discussed in more detail, below.

While the exemplary system 100 of FIG. 1 employs a client-server architecture, a skilled artisan will recognize that the present disclosure is not limited to such an architecture. The exemplary system 100 could equally well find application in a distributed, or peer-to-peer, architecture system. The one or more modules 127 and the authoring modules 105 may also be implemented as standalone software programs, which do not necessarily have networking capabilities.

The first 109 and second 113 web clients access the one or more modules 127 via the web interface supported by the web server 123. Similarly, the programmatic client 103 accesses the various services and functions provided by the one or more modules 127 via the programmatic interface provided by the API server 121. The programmatic client 103 may be, for example, a seller application (e.g., the "Turbo Lister 2" application developed by eBay Inc., of San Jose, Calif.) enabling sellers to author and manage data items or listings on the information storage and retrieval platform 120 in an off-line manner. Further, batch-mode communications can be performed between the programmatic client 103 and the information storage and retrieval platform 120. In addition, the programmatic client 103 may include, as previously indicated, the authoring modules 105 used to author, generate, analyze, and publish domain rules and aspect rules used in the information storage and retrieval platform 120 to structure data items and transform queries. Such domain and aspect rules are known independently in the art.

Figure 2:
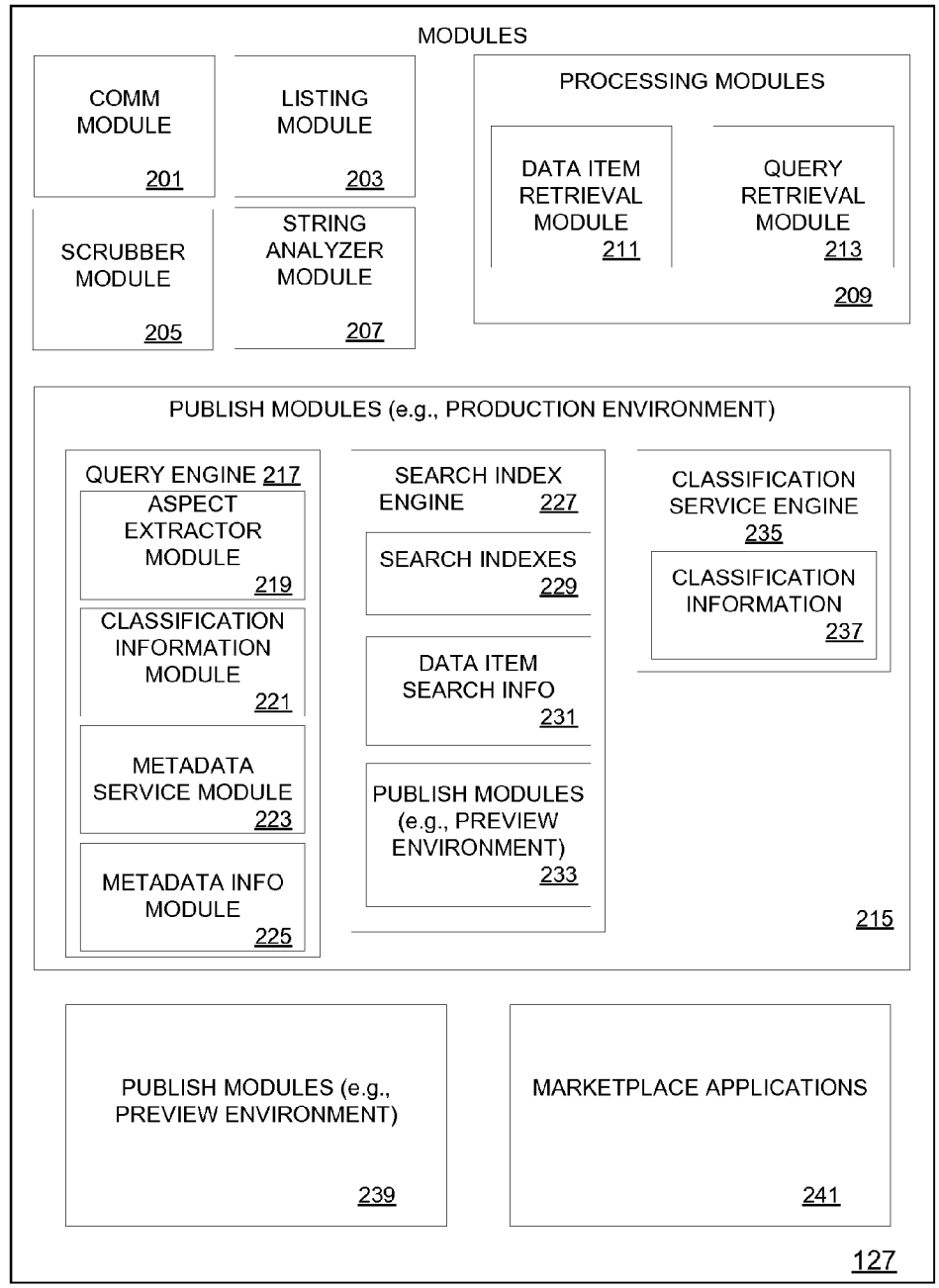
FIG. 2 is a block diagram illustrating an exemplary embodiment of various modules of the network architecture of FIG. 1.

Referring now to FIG. 2, an exemplary block diagram of the one or more modules 127 includes a communication module 201, a listing module 203, a scrubber module 205, a string analyzer module 207, a plurality of processing modules 209, and a first 215 and second 239 publishing module. The first publishing module 215 is used in a production environment while the second publishing module 239 is used in a preview environment. The one or more modules 127 further includes a marketplace application block 241. Each of the first 215 and second 239 publishing modules includes a query engine 217, a search index engine 227, and a classification service engine 235 (the individual engines are only shown in the first publishing module 215 but are readily envisioned by a skilled artisan in the second publishing module 239 as well). The first 215 and second 239 publishing modules are each utilized to publish new or existing rules to either the production environment or the preview environment, as appropriate, in the information storage and retrieval platform 120 of FIG. 1 thereby enabling the rules to be operative (e.g., applied to data items and queries) in the respective environments.

In a specific exemplary embodiment, the information storage and retrieval platform 120 of FIG. 1 may be embodied as a network-based marketplace that supports the transaction of data items or listings (e.g., goods or services) between sellers and buyers. One such marketplace is eBay, the World's Online Marketplace, developed by eBay Inc., of San Jose, Calif. In this specific exemplary embodiment, the information storage and retrieval platform 120 may receive information from sellers describing the data items that may subsequently be retrieved by potential buyers or bidders. The one or more modules 127 may therefore include the marketplace application block 241 to provide a number of marketplace functions and services to end-users that access the information storage and retrieval platform 120.

The preview environment enables a category manager (not shown) to analyze rules and determine whether such rules perform as expected without affecting live operations in the production environment. For example, the preview environment enables a most popular query analysis, a domain coverage analysis, an aspect coverage analysis, and an aspect-value pair coverage analysis as described later in this document. After determining that rules perform as expected, the category manager publishes the rules to the production environment in the information storage and retrieval platform 120.

The communication module 201 receives a query from one or more of the client machines 101, 107, 111 (FIG. 1). The query may include one or more constraints (e.g., keywords, categories, or information specific to a type of data item). The communication module 201 interacts with the query engine 217 and the search index engine 227 to process the query. The communication module 201 receives aspect-value pairs extracted from the query. Further, the communication module 201 constructs a transformed query based on the aspect-value pairs extracted from the query and communicates an interface (e.g., a user interface) to an end-user at one or more of the client machines 101, 107, 111.

A query retrieval module 213 receives information from one or more of the client machines 101, 107, 111 and stores the information as a data item in the one or more information storage databases 131 (FIG. 1). For example, an end-user acting as a seller may operate one of the one or more of the client machines 101, 107, 111 entering descriptive information for a data item for the purpose of offering the data item for sale or auction through the information storage and retrieval platform 120.

The plurality of processing modules 209 receives classification information and metadata information. The plurality of processing modules 209 publishes the classification and metadata information to a production environment or a preview environment. The plurality of processing modules 209 may also publish to the production environment by publishing the classification and metadata information to backend servers (not shown) that host the query engine 217, the search index engine 227, and the classification service engine 235. The plurality of processing modules 209 publishes to a preview environment by publishing the classification and metadata information to a local backend server (not shown) hosting the query engine 217, the search index engine 227, and the classification service engine 235.

The plurality of processing modules 209 further includes a data item retrieval module 211 to receive requests for data items from a category manager operating the first client machine 101. For example, responsive to receiving a request, the data item retrieval module 211 reads data items from the data item information stored on the one or more information storage databases 131 (FIG. 1) and stores the data items as sample information in the database 115.

The query retrieval module 213 receives requests for queries from a category manager operating the first client machine 101. For example, responsive to receiving the request, the query retrieval module 213 reads queries from the sample information and communicates the queries to the first client machine 101.

The scrubber module 205 receives item information entered by one or more of the client machines 101, 107, 111 creating a data item. The scrubber module 205 utilizes services of the classification service engine 235 to structure the item information in the data item (e.g., applies domain and aspect rules).

The string analyzer module 207 receives requests from the first client machine 101 to identify candidate values to associate with an aspect. The request may include the aspect and one or more values that have been associated to the aspect. The string analyzer module 207 utilizes the aspect (e.g., "color") to identify strings of text in a database that includes the aspect. The string analyzer module 207 relies on various services provided in the information storage and retrieval platform 120 to identify and process the strings of text. For example, the string analyzer module 207 utilizes services that expand the aspect to a derivative form of the aspect including a singular form (e.g., "color"), a plural form (e.g., "colors"), a synonymous form, an alternate word form (e.g., "chroma," "coloring," "tint"), a commonly misspelled form (e.g., "collor") or an acronym form.

In a specific exemplary embodiment, the string analyzer module 207 identifies boundaries of a string of text based on a position of the aspect and derivatives thereof in the string of text. For example, the string analyzer module 207 identifies boundaries of the string of text based on a predetermined number of words to the left and right of the aspect in the string of text. The predetermined number of words may be a configurable value. After the strings of text have been identified, the string analyzer module 207 relies on a service in the information storage and retrieval platform 120 to remove any stop words from the strings (e.g., "the," "and," or "if"). For example, stop words may include prepositions and antecedents since they are not candidate values. Next, the string analyzer module 207 removes the aspect values received in the request from the string. Finally, the string analyzer module 207 returns the remaining candidate values to the first client machine 101.

A database (not shown specifically) utilized by the string analyzer module 207 includes queries that have been entered by a user to the information storage and retrieval platform 120 or data items that have been entered by a user to the information storage and retrieval platform 120, dictionaries, or thesauruses. The string analyzer module 207 analyzes the strings of text to identify candidate values to associate with the aspect. More examples of query strings and searching techniques are given, below.

The classification service engine 235 applies domain rules and aspect rules to data items. For example, the classification service engine 235 applies domain rules to identify one or more domain-value pairs (e.g., product type=electronic MP3 players) associated with the data item. The classification service engine 235 further applies the aspect rules to identify aspect-value pairs (e.g., brand=Apple) associated with the data item. The classification service engine 235 applies the domain and aspect rules to data items or listings as they are added to the information storage and retrieval platform 120 or responsive to the publication of new rules (e.g., domain rules or aspect rules).

The classification service engine 235 processes data items received from the second 107 and third 111 client machines. For example, the scrubber module 205 uses services of the classification service engine 235, as described previously, to apply domain rules and aspect rules to the data item. The classification service engine 235 further stores the data item, with the associated domain-value pairs and aspect-value pairs, in the one or more information storage databases 131 (FIG. 1) as item search information. Further, the classification service engine 235 pushes or publishes item search information over a bus (not shown but implicitly understood by a skilled artisan) in real time to the search index engine 227. The classification service engine 235 executes in the preview environment enabling analysis of newly authored rules before publication of the rules to the production environment. The classification service engine 235 further maintains histogram information in the form of data item counters as the domain and aspect rules are applied to the data items. For example, the classification service engine 235 may increment a data item counter responsive to a condition clause in a domain or aspect rule evaluating TRUE. The histogram information communicates to one or more of the client machines 101, 107, 111 that utilize the histogram information to determine percentage coverage for most popular queries, domains, aspects, and aspect-value pairs.

The query engine 217 includes an aspect extractor module 219, a classification information module 221, a metadata service module 223, and a metadata information module 225. In the production environment, the aspect extractor module 219 receives a query from the communication module 201 and applies aspect rules to extract aspect-value pairs from the query. Further, the aspect extractor module 219 communicates the query received from the communication module 201 to the plurality of processing modules 209 that stores the query as sample query information.

In the preview environment, the aspect extractor module 219 receives the most popular queries from one or more of the client machines 101, 107, 111 and applies aspect rules to extract aspect-value pairs from the query. Further, the aspect extractor module 219 maintains histogram information in the preview environment while applying the aspect rules to the queries. For example, the query engine 217 responds to a condition clause that evaluates TRUE (e.g., matching keyword) by incrementing a data item counter associated with the respective query. Further, in the production environment, the aspect extractor module 219 communicates the aspect-value pairs to the communication module 201.

The metadata service module 223 communicates metadata information to the communication module 201 based on a query received from the communication module 201. The metadata information includes metadata that the communication module 201 uses to format and generate an interface (e.g., a user interface).

The search index engine 227 includes search indexes and data item search information (e.g., including data items and associated domain-value pairs and aspect-value pairs). In the production environment, the search index engine 227 receives the transformed query from the communication module 201 and utilizes the search indexes to identify data items based on the transformed query. Further, in the production environment, the search index engine 227 communicates the found data items to the communication module 201.

Application of Ranking Search Box Auto-Complete into the Exemplary Network Architecture As noted above, a traditional search box auto-complete process has no ranking functionality. Thus, as an end-user enters search or query data, an auto-complete backend system will only respond with a generalized keyword list against a particular user-entered prefix for which a request is made. Currently, there is no ranking capability which prioritizes a returned keyword list based on conversion rate (i.e., turnover rate of a particular type of item), a frequency of the search term, or availability of an item.

A browser coupled to an end-user (e.g., to the one or more client machines 101, 107, 111 of FIG. 1) communicates with a remote system (e.g., information storage and retrieval platform 120) via a communications protocol such as the HTTP protocol (known independently to one skilled in the art). The total contents of a single keyword list typically only accounts for approximately one hundred bytes. However, an HTTP header routinely takes about 200 bytes. For a stable (not start-up status) HTTP connection, which is based on the TCP protocol, the HTTP connection is able to carry at least 1460 bytes, exclusive of any overhead in the transmission protocol. The trip time for a package with one byte of information is almost identical to that of a package with 1460 bytes. Thus, there is effectively no additional time required for a round trip of the 1460 byte package. Consequently, the traditional response approach does not make even full use of the throughput capability of each HTTP connection.

By implementing a ranking algorithm or method, described herein, a much better match exists between what the end-user is searching for in the query and a returned keyword list. Thus, considerable time is saved for a response to appear to the end-user because numerous trips to and from the remote server are not required. The round trip savings becomes increasingly important with either a slow user connection to the Internet or with heavy traffic in the communications path. Additionally, the load on the remote server is reduced since the response to the user's query is available more quickly and the remote server does not need to be accessed multiple times. The ranking algorithm employs data collected and stored in a variety of databases worldwide (e.g., the one or more information storage databases 131 of FIG. 1). A search tree (e.g., a trie tree, known independently in the art) or other structure can be utilized to anticipate and thus predict the end-users query.

Search Method

Figure 3:
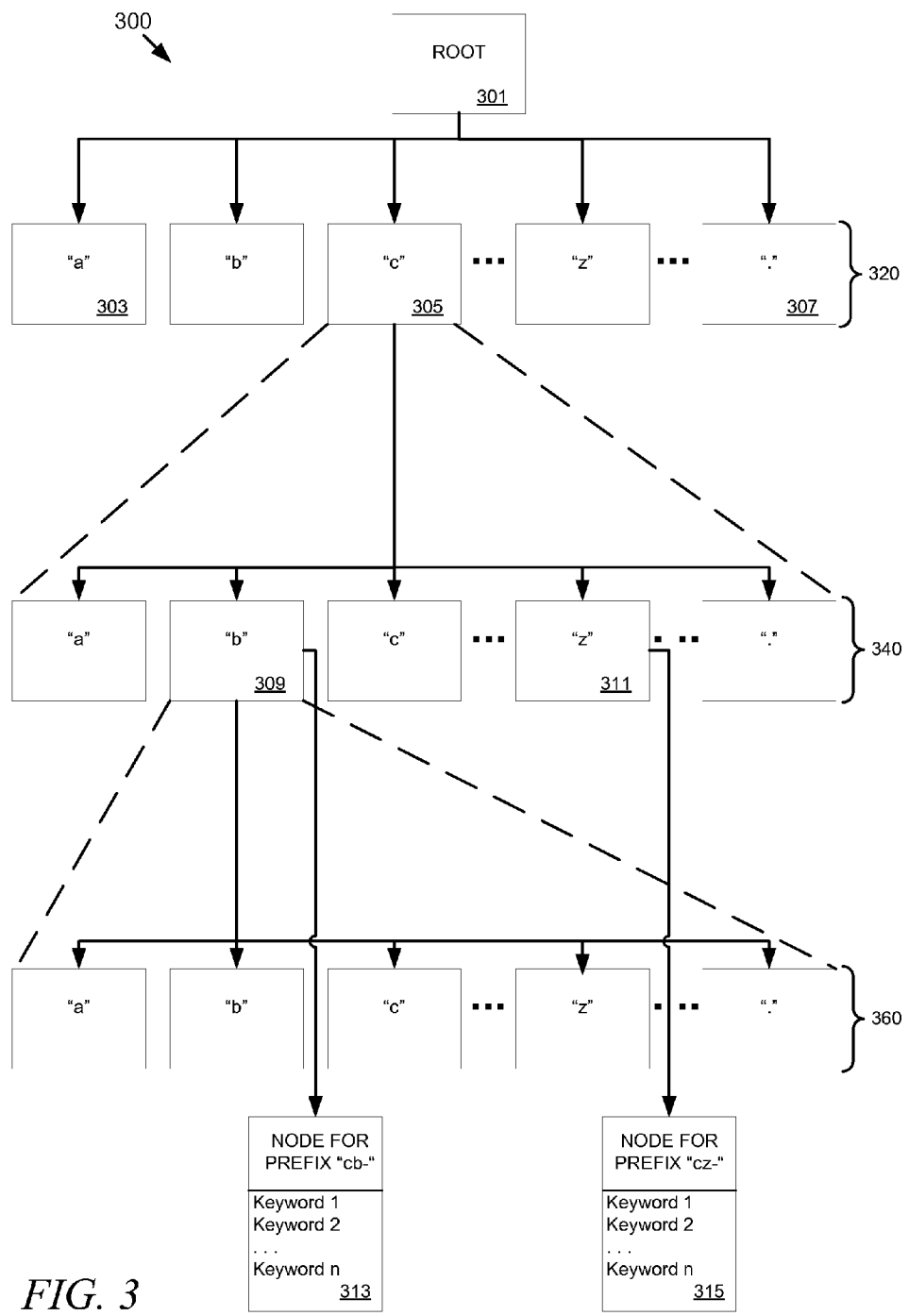
FIG. 3 is a schematic representation of an exemplary trie tree structure used in query and search engines used in the modules of FIG. 2.

With reference now to FIG. 3, an exemplary trie tree structure 300 includes a root node 301, a first level plurality of child nodes 320, a second level plurality of child nodes 340, and a third level plurality of child nodes 360. In this exemplary embodiment, each of the child nodes includes letters "a," "A," "b," "B" through "z," "Z"; numbers "0," "1," through "9"; and characters &, -, +, ', :, ., and "(all characters are shown in bold merely for clarity).

Keywords are selected as a set of equivalent keywords for the prefix. Equivalent keywords are selected by finding all possible prefixes for a group of equivalent words, selecting the best keywords for every prefix from the group, and calculating weights of selected keywords.

Each node within the various levels of child nodes 320, 340, 360 has n child nodes, where n is a total count of the letters, numbers, and other characters supported. Information kept in a node includes, for example, a current best keyword for the prefix in the group.

For example, a prefix is entered into the root node 301 of the exemplary trie tree structure 300. Each non-root node at each level represents a supported letter, number, or other character (e.g., an "a" is contained in a first node 303 and a "." is contained in a final node 307 at the first level plurality of child nodes 320). Thus, for each non-root node, there is a corresponding string that represents a prefix. If the prefix entered into the root node 301 contains a "c," then a third node 305 is selected from the first level plurality of child nodes 320. Child nodes of the third node 305 are selected within the second level plurality of child nodes 340. If the second character of the prefix following "c" is a "b," then a second node 309 of the second level plurality of child nodes 340 is chosen. The second node 309 is coupled to a first keyword node 313. Similarly, if the second character of the prefix following "c" is a "z," then a last letter node 311 of the second level plurality of child nodes 340 is chosen. The last letter node 311 is coupled to a second keyword node 315. Either the first 313 or second 315 keyword node contains a plurality of keywords that began with either "cb" or "cz," respectively. An order in which the keywords are listed depends on a variety of factors described below. (As used herein, the entire set of letters, numbers, and characters may simply be referred to as characters.)

Thus, the exemplary trie tree structure 300 stores all nodes along with corresponding keyword lists and a weighting factor for each of the keywords. To build the recommendation list file for a node, a keyword is added against a specific prefix. The most highly-weighted keyword lists generated from each sub-list are added to the file. The exemplary trie tree structure 300 is configured to store all nodes, corresponding keyword lists, and weighting factors for each keyword.

In brief, when building the recommendation list file for a node, the keyword list is first added against that specific prefix. The most highly-weighted keyword lists from a given sub-node are then appended to the file and returned to the end-user in a keyword list based on order of weighting.

Equivalent Keyword Selection

Figure 4:
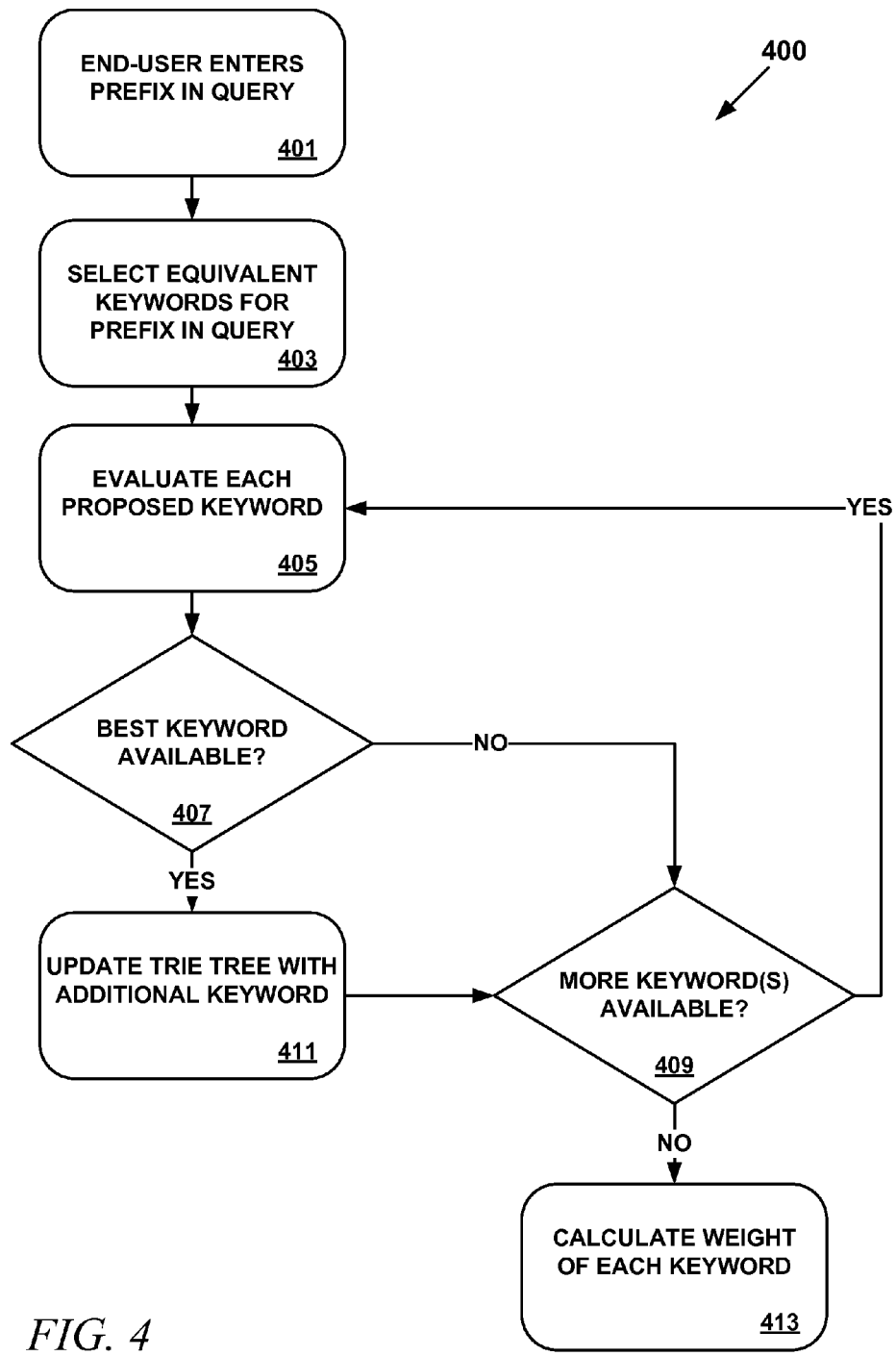
FIG. 4 is a flowchart of an exemplary method for selecting and calculating a weight of keywords matching a prefix in a query.

With reference now to FIG. 4, a flowchart 400 of an exemplary method begins with an end-user entered (401) prefix as a query in a remote search box (not shown). From the user-entered prefix, equivalent keywords for prefixes are selected (403) as proposed keywords. The equivalent keywords include both keywords that match at least a portion of the prefix and also keywords that match as an infix. Each proposed keyword from the group of equivalent keywords selected is evaluated (405) based on a ranking strategy. The ranking strategy is discussed in detail, below, but generally ensures the end-user gets a response that includes the most likely keyword group based on numerous similar searched conducted by other end-users previously. A determination is made whether the keyword being evaluated is one of the best keywords available (407) for the prefix entered in the query.

If a result of the determination of the best keywords available (407) is positive, an appropriate node in the trie tree (FIG. 3) is updated (411) with an additional keyword. A determination is then made whether additional keywords are available (409). If additional keywords are available (409), the flowchart 400 reiterates the process described above until each equivalent keyword has been evaluated. Once all equivalent keywords have been evaluated, a weight for each of the best group of keywords remaining is calculated (413). Calculation of weights is based on a plurality of factors and is discussed in more detail, below. However, the weighting applied to each keyword generally determines how high each of the best keywords appears in a list returned to the end-user. The higher the calculated weight, the higher the position of the word on the returned list. An overall length of the returned list is based on the number of keywords that will fit into as little as one TCP package. The overall package size is also discussed in detail, below.

If a determination is made the keyword being evaluated is not one of the best keywords available (407), a determination is then made whether additional keywords are available (409). If additional keywords are available (409), the flowchart 400 reiterates the process as described above until each keyword has been evaluated and the best keywords weighted. If a determination is made that additional keywords are not available (409), a weight for each of the best group of keywords remaining is calculated (413).

With reference again to FIG. 3, the exemplary trie tree structure 300 can be utilized to perform the selecting, evaluation, updating, and calculating steps of the flowchart 400 defining the exemplary method. As noted above, there is one root node 301 for the exemplary trie tree structure 300. Each non-root node represents a supported character. Thus, there is a corresponding string associated with each non-root node, representing a prefix. Each node has n child nodes, where n is the count of characters supported.

The information kept in a node includes, for example, a current best keyword for the prefix in the group, a weight of the current best keyword, and a merged value of a variety of weighting factors, described below.

Ranking Factors

A variety of ranking factors can be chosen to apply weighting to the best keywords selected. The factors can be selected based on a particular type of industry, a particular consumer group, a particular product type, and a variety of other quantitative or qualitative indicators.

For example, suggested keywords returned to an end-user can match the prefix closely. Thus, the suggested keyword can be considered to match a prefix if the keyword starts with the one or more prefixes or has a substring within the keyword (i.e., an infix).

Alternatively, the prefix can be the substring of the keyword and the substring starts from the beginning of a single word in the keyword. For example, both keywords ipod nano and apple ipod match the prefix ipo as noted above. But the keyword mika lollipop does not match the prefix. The keywords ipod and ipods both match the prefix ip. However, if the keyword ipod has a higher weight than ipods based on a set of weighting factors, then only ipod will be suggested as a keyword for the prefix. Alternatively, both the keywords ipod and ipods may be returned in the keyword list, but ipod will be higher in the list than ipods. Therefore, the closeness of the prefix or infix to the keyword itself can be one type of weighting factor.

Consider a specific exemplary embodiment in an electronic on-line auction environment. In the on-line auction environment, millions of prefixes are entered by end-users, around the world, as search terms on a daily basis. As a result of the huge number of queries, "query count" becomes a candidate for use as a weighting factor.

Also, the number of items available on which to bid or purchase becomes another potential weighting factor. For example, envision a scenario in which 100,000 ipod nano players and 10,000 ipod shuffle players are available, both for either bidding or purchasing. The weighting factor, "item count," associated with the ipod nano has a higher weight than the factor associated with the ipod shuffle. Consequently, the ipod nano keyword appears higher on the list than the ipod shuffle. Indeed, the ipod shuffle may not even appear on the returned keyword list depending on other weighting factors.

Similarly, weighting factors associated with other attributes of an item can be established. For example, weighting factors such as "bid count," associated with the number of bids received on a particular item type, "purchase count," associated with the number of purchases made on a particular item type, and "watch count," associated with the number of items placed on a "watch item list" are all exemplary candidates for weighting factors.

Additionally, factors such as "bid count," "purchase count," and "watch count" are often only sensible in terms of an absolute number of items (i.e., "item count") for a particular item. Therefore, each of these factors can be normalized in terms of total item count. Thus, "bid count divided by item count," "purchase count divided by item count," and "watch count divided by item count" all become weighting factor candidates.

A specific exemplary embodiment of weighting factors, useful in the electronic on-line auction environment, is given in Table I, below. An applied weight determines how much the particular weighting factor should affect a particular overall weighting value.

TABLE I

| Weighting Factor | Applied Weight |
| --- | --- |
| Query Count | 0.5 |
| Item Count | 0.3 |
| Bid Count/ Item Count | 0.2 |
| Purchase Count/ Item Count | 0.2 |
| Watch Count/ Item Count | 0.2 |
| Prefix or Infix | 0.1 |

The overall weighting value applied to a keyword can then simply be a summation of all weighting factors multiplied times the individual applied weight of each factor. Hence, equation (1) determines the overall weighting, effectively a type of ranking algorithm or method:

$$T_w = \sum_{j=1}^{i} W_j a_j, i = 1, \ldots, n \qquad (1)$$

where $T_w$ is the total factor applied to each of the best keywords selected (e.g., see "Best Keyword Available" (407) of FIG. 4), $W_j$ is the quantity of a particular weighting factor, $a_j$ is the applied weight associated with each weighting factor, and i is the total number of weighting factors available.

In a specific exemplary scenario where equation (1) is applied, the top one million queries based on the query frequency are selected. For each query, six features are selected daily. Three of the features include query count, supplying item count, and a prefix or infix property. The other three features are bid count divided by item count, purchase count divided by item count, and bin count divided by item count, which reflect a transition rate (i.e., a click through rate) of that query. Each feature is given a weight and a score calculated for each query. Then, the one million queries are sorted according to score. Finally, equation (1) is applied to each keyword to build up the entire recommendation keyword list. When an end-user types some characters, the top seven queries which meet with a prefix or infix of those characters will be returned to the end-user and appear in a search box recommendation list based on rank. A keyword with higher rank will show up ahead of that with a lower rank. Thus, the keywords suggested and returned have a higher probability to be picked up and clicked through, which implies a higher probability of dealing rate and revenue to a network or Internet-based item supplier.

Based on the information presented herein, a skilled artisan can readily envision other types of weighting factors useful in an on-line auction environment. Additionally, the skilled artisan can also apply the techniques presented herein to a variety of other industries and on-line environments. Further, a skilled artisan will recognize that other searching techniques, known independently in the art, may be substituted for the exemplary trie tree structure 300 of FIG. 3.

HTTP Package Size and Returned Keyword Lists

To make full use of the carrying capability of each HTTP package in the prefix/query and returned keyword response, the package size is enlarged as much as possible while ensuring that the data transition only takes as little as one TCP package (recall the TCP package size is 1460 bytes, exclusive of overhead). Numerous worst-case scenario testing has been performed to determine a practical upper limit of the package size based on what the network is able to support.

For the testing, network connections from San Jose, Calif. to Shanghai, China were employed. The testing revealed that a practical buffer size upper limit was four kilobytes of useful data that could be sent in a single TCP package. Thus, the worst-case scenario found enlarging the package size to four kilobytes in a single TCP package was consistently possible. A compression algorithm, such as "gzip" (available on-line from http://www.gzip.org/, last viewed Oct. 20, 2008) or other compression utilities known in the art can be used to compress the file before it is sent. A resulting text file less than four kilobytes is generally one kilobyte after compression.

Several benefits accrue from use of the ranking algorithm or method disclosed herein. By using ranking data, a keyword list returned to the end-user is more likely to be accurate (i.e., what the end-user is looking for in the proper order) since most keyword lists of current sub-nodes have been already ranked based on the huge amount of data stored in the information storage and retrieval platform 120. An average response time to a query or search is also decreased since most of the time data are already in memory. Thus, the end-user's browser is able to show the data immediately on only entering one or two characters. Additionally, there is no data transmission response time difference between responses to each entered character of the prior art and all probable responses being sent concurrently as described herein since both are transmitted via only a single TCP package. Since the request frequency based on multiple searches or queries is reduced, the workload of the web server is also reduced commensurately.

While various embodiments of the present invention are described with reference to assorted implementations and exploitations, it will be understood that these embodiments are illustrative only and that a scope of the present inventions are not limited to them. In general, techniques for the ranking algorithm or method may be implemented with facilities consistent with any hardware system or hardware systems defined herein. Many variations, modifications, additions, and improvements are possible.

Plural instances may be provided for resources, operations, or structures described herein as a single instance. Finally, boundaries between various resources, operations, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of the present invention that is represented by the appended claims.

Modules, Components, and Logic

Additionally, certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

Figure 5:
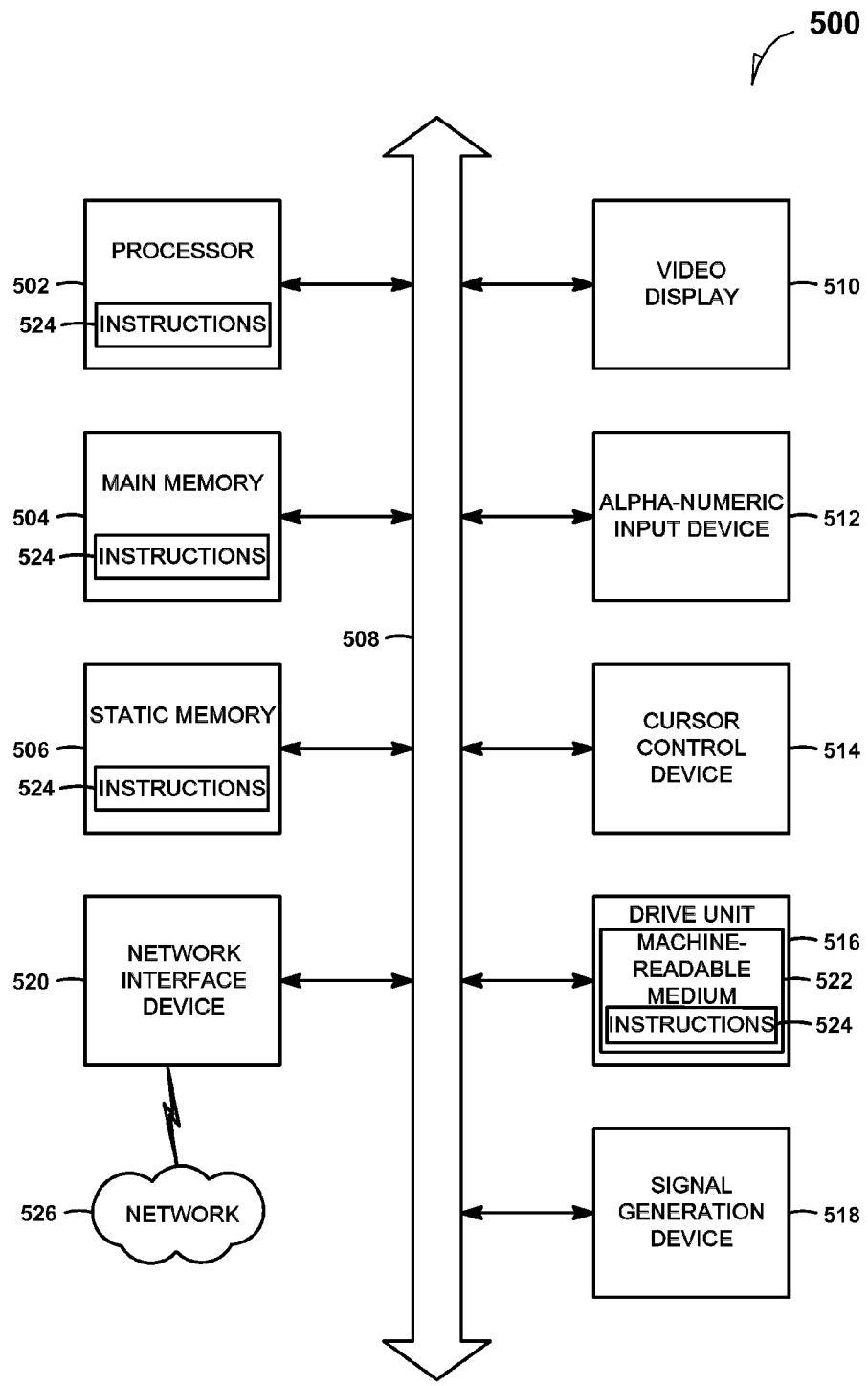
FIG. 5 is a simplified block diagram of a machine in an exemplary form of a computing system within which a set of instructions, for causing the machine to perform any one or more of the methodologies discussed herein, may be executed.

With reference to FIG. 5, an exemplary embodiment extends to a machine in the exemplary form of a computer system 500 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker), and a network interface device 520.

Machine-Readable Medium

The disk drive unit 516 includes a machine-readable medium 522 on which is stored one or more sets of instructions and data structures (e.g., software 524) embodying or used by any one or more of the methodologies or functions described herein. The software 524 may also reside, completely or at least partially, within the main memory 504 or within the processor 502 during execution thereof by the computer system 500; the main memory 504 and the processor 502 also constituting machine-readable media.

While the machine-readable medium 522 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The software 524 may further be transmitted or received over a communications network 522 using a transmission medium via the network interface device 520 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an embodiment has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is, in fact, disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

For example, particular embodiments describe various arrangements, algorithms, programming tools, and topologies of systems. A skilled artisan will recognize, however, that additional embodiments may be focused on electronic business applications and accompanying system architectures in general and not specifically to electronic searching of consumer sites.

These and various other embodiments are all within a scope of the present invention. The specification and drawings are, accordingly, to be regarded in an illustrative rather than a restrictive sense.

What is claimed is:

1. A method, comprising:
   selecting a plurality of equivalent keywords responsive to a search query;
   determining a rank of each of the plurality of equivalent keywords, the rank being based on parameters including a number of bids on items matching the search query and a number of items matching the search query being placed on a watch list;
   selecting a plurality of most highly ranked keywords from the plurality of equivalent keywords; and
   preparing a response to the search query including the plurality of most highly ranked keywords.

2. The method of claim 1, further comprising transmitting the response.

3. The method of claim 2, further comprising fitting the response within a single communications packet prior to transmitting the response.

4. The method of claim 1, wherein the selecting the plurality of equivalent keywords is based on one or more characters within the search query.

5. The method of claim 4, wherein the one or more characters are received within a single packet.

6. The method of claim 1, further comprising basing the rank on a turnover rate of a listing to which the search query is directed.

7. The method of claim 1, wherein the determining of the rank includes calculating a weight of each of the plurality of equivalent keywords.

8. The method of claim 1, further comprising basing the weighting on at least one item in a group of parameters, the parameters consisting of most frequent queries, a number of items available matching the search query, the number of bids on items matching the search query, a number of purchases of items matching the search query, and the number of items matching the search query being placed on a watch list.

9. The method of claim 1, further comprising selecting the plurality of equivalent keywords from a weighted database.

10. The method of claim 1, wherein selecting the plurality of equivalent keywords responsive to the search query includes finding prefixes or infixes to match available keywords from one or more consecutive characters from the search query.

11. A method, comprising:
    receiving one or more characters from an end-user as a query;
    selecting a plurality of equivalent keywords responsive to the query, the plurality of equivalent keywords being selected based on a consideration of matching at least a portion of the one or more characters both as a prefix and an infix;
    evaluating each of the plurality of equivalent keywords based on a probability of matching the query of the end-user;
    determining a rank of each of the plurality of equivalent keywords, the rank being based on parameters including a number of bids on items matching the search query and a number of items matching the search query being placed on a watch list;
    selecting a plurality of most highly ranked keywords from the plurality of equivalent keywords;
    preparing a subset of the plurality of most highly ranked keywords based on the matching probability, the subset forming a response; and
    transmitting the response to the end-user.

12. The method of claim 11, further comprising selecting the plurality of equivalent keywords from a weighted database.

13. The method of claim 12, further comprising updating the weighted database based on a determination of a positive matching of at least one of the subset of the plurality of most highly ranked keywords.

14. The method of claim 13, wherein the updating includes increasing a weighting factor for the at least one of the subset of the plurality of most highly ranked keywords.

15. The method of claim 11, further comprising basing a rank of the plurality of most highly ranked keywords on a turnover rate of a listing to which the search query is directed.

16. The method of claim 15, wherein the determining of the rank includes calculating a weight of each of the plurality of most highly ranked keywords.

17. A tangible machine-readable storage medium having no transitory signal components and storing instructions that, when executed by one or more processors, causes the one or more processors to perform operations, comprising:
    selecting a plurality of equivalent keywords responsive to a search query;
    determining a rank of each of the plurality of equivalent keywords, the rank being based on parameters including a number of bids on items matching the search query and a number of items matching the search query being placed on a watch list;
    selecting a plurality of most highly ranked keywords from the plurality of equivalent keywords; and
    preparing a response to the search query including the plurality of most highly ranked keywords.

18. The tangible machine-readable storage medium of claim 17, wherein the determining of the rank includes calculating a weight of each of the plurality of equivalent keywords.

19. The tangible machine-readable storage medium of claim 18, further comprising basing the weighting on at least one item in a group of parameters, the parameters consisting of most frequent queries, a number of items available matching the search query, the number of bids on items matching the search query, a number of purchases of items matching the search query, and the number of items matching the search query being placed on a watch list.

* * * * *